United States Patent
Downing et al.

(10) Patent No.: US 11,460,307 B2
(45) Date of Patent: Oct. 4, 2022

(54) SYSTEM AND METHOD FOR PROCESSING VEHICLE EVENT DATA FOR JOURNEY ANALYSIS

(71) Applicant: Wejo Ltd., Cheshire (GB)

(72) Inventors: Roger Downing, Flintshire (GB); Alan Gawthorpe, Cheshire (GB)

(73) Assignee: Wejo Ltd., Cheshire (GB)

( * ) Notice: Subject to any disclaimer, the term of this patent is extended or adjusted under 35 U.S.C. 154(b) by 156 days.

(21) Appl. No.: 16/787,755

(22) Filed: Feb. 11, 2020

(65) Prior Publication Data

US 2020/0256683 A1 Aug. 13, 2020

Related U.S. Application Data

(60) Provisional application No. 62/803,832, filed on Feb. 11, 2019, provisional application No. 62/805,447, filed on Feb. 14, 2019, provisional application No. 62/810,098, filed on Feb. 25, 2019, provisional application No. 62/824,670, filed on Mar. 27, 2019.

(51) Int. Cl.
| | |
|---|---|
| G01C 21/32 | (2006.01) |
| G06F 16/29 | (2019.01) |
| H04W 4/40 | (2018.01) |
| G07C 5/00 | (2006.01) |
| G07C 5/08 | (2006.01) |
| H04W 4/021 | (2018.01) |

(52) U.S. Cl.
CPC ............. *G01C 21/32* (2013.01); *G06F 16/29* (2019.01); *G07C 5/008* (2013.01); *G07C 5/0841* (2013.01); *H04W 4/021* (2013.01); *H04W 4/40* (2018.02); *G05B 2219/42342* (2013.01)

(58) Field of Classification Search
CPC ........ G01C 21/32; G06F 16/30; G06K 19/06; G08G 1/02; G01M 17/00; H04W 4/021
See application file for complete search history.

(56) References Cited

U.S. PATENT DOCUMENTS

| | | | | |
|---|---|---|---|---|
| 11,138,885 | B2* | 10/2021 | Pandurangarao | G08G 1/164 |
| 2014/0274154 | A1* | 9/2014 | Rana | G05B 13/0265 |
| | | | | 455/456.3 |
| 2015/0278277 | A1* | 10/2015 | Agrawal | H04W 64/00 |
| | | | | 707/746 |
| 2016/0042261 | A1* | 2/2016 | Kieser | A61B 6/12 |
| | | | | 235/494 |
| 2016/0293000 | A1* | 10/2016 | Torgerson | G01S 19/42 |
| 2018/0040011 | A1* | 2/2018 | Milton | H04W 4/021 |
| 2020/0068339 | A1* | 2/2020 | Iska | H04W 4/33 |
| 2020/0068341 | A1* | 2/2020 | Iska | H04W 4/021 |

(Continued)

OTHER PUBLICATIONS

Deb Das et al "Automated Urban Travel Interpretation: A Bottom-up Approach for Trajectory Segmentation", Sensors, vol. 16, No. 11, Nov. 23, 2016, p. 1962, MDPI, Basel, Switzerland (Year: 2016).*

(Continued)

*Primary Examiner* — Yuri Kan
(74) *Attorney, Agent, or Firm* — Reising Ethington P.C.

(57) ABSTRACT

Embodiments are directed to a system and method for ingesting location event data and identifying a journey for a vehicle from the event data. The journey identification includes identifying whether a given vehicle is moving for purposes of driving to a journey destination.

26 Claims, 9 Drawing Sheets

(56) References Cited

U.S. PATENT DOCUMENTS

2020/0183900 A1* 6/2020 Iska .................. G06K 9/6218
2021/0092551 A1* 3/2021 Millington ....... G08G 1/096833

OTHER PUBLICATIONS

International Preliminary Report on Patentability for related international application PCT/IB2020/000114, 11 pages, dated Aug. 10, 2021.
International Search report and Written Opinion for related international application PCT/IB2020/000114, 17 pages, dated Aug. 24, 2020.
International Search report and Written Opinionfor corresponding international application PCT/IB2020/000164, 16 pages, dated Sep. 3, 2020.
Partial search report for corresponding international application PCT/IB2020/000164, 11 pages, dated Jul. 13, 2020.
Deb Das et al "Automated Urban Travel Interpretation: A Bottom-up Approach for Trajectory Segmentation", Sensors, vol. 16, No. 11, Nov. 23, 2016, p. 1962, MDPI, Basel, Switzerland.

* cited by examiner

SYSTEM AND METHOD FOR PROCESSING VEHICLE EVENT DATA FOR JOURNEY ANALYSIS

CROSS-REFERENCE TO RELATED APPLICATIONS

The present application claims priority to the following: U.S. provisional patent applications, the entirety of each of which is incorporated by reference herein; U.S. Prov. Pat. App. No. 62/803,832, filed on Feb. 11, 2019; U.S. Prov. Pat. App. No. 62/805,447, filed on Feb. 14, 2019; U.S. Prov. Pat. App. No. 62/810,098 filed on Feb. 25, 2019; and U.S. Prov. Pat. App. 62/824,670 filed on Mar. 27, 2019.

BACKGROUND OF THE DISCLOSURE

The automotive industry is undergoing a radical change unlike anything seen before. Disruption is happening across the whole of the mobility ecosystem. The result is vehicles that are more automated, connected, electrified and shared. This gives rise to an explosion of car generated data. This rich new data asset remains largely untapped.

Vehicle location event data such as GPS data is extremely voluminous and can involve 200,000-600,000 records per second. The processing of location event data presents a challenge for conventional systems to provide substantially real-time analysis of the data, especially for individual vehicles. Further, individual vehicle data faces challenges for properly anonymizing it while identifying individual vehicle data for analysis at these scales. What is needed are system platforms and data processing algorithms and processes configured to process and store high-volume data with low latency while still making the high-volume data available for analysis and re-processing.

While there are systems for tracking vehicles, what is needed is near real-time and accurate journey data from high-volume vehicle data. What is needed is systems and algorithms configured to accurately identify journeys and journey destinations from vehicle movement and route analysis.

SUMMARY OF THE DISCLOSURE

The following briefly describes embodiments to provide a basic understanding of some aspects of the innovations described herein. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments of a system, method, and computer program product for processing vehicle event data are disclosed herein.

At least one embodiment is a system comprising a memory including program instructions and a processor configured to execute the instructions for the method comprising: ingesting location event data; and identifying a journey for a vehicle from the event data, wherein the journey identification comprises identifying whether a given vehicle's movement is a journey segment for the journey.

In an embodiment, the event data can include time, position (lat/long), and an event of interest. The event of interest can include a harsh brake, a harsh deceleration, or a harsh acceleration. A harsh brake or harsh deceleration can be defined as a deceleration in a predetermined period of time. A harsh acceleration is defined as an acceleration in another predetermined period of time.

In an embodiment, the processor is configured to execute the instructions for the method further comprising encoding location data in the event data to a proximity.

In an embodiment, the encoding of the location data in the event data to a proximity can further comprise at least one of: geohashing latitude and longitude to a shape defining the proximity; encoding the geohash to identify a state; encoding the geohash to identify a zip code; and encoding the geohash to a precision to uniquely identify a vehicle.

In an embodiment, the encoding of the location data in the event data to a proximity can further comprise at least one of: encoding the geohash to 5 characters to identify the state; encoding the geohash to 6 characters to identify the zip code; and encoding the geohash to 9 characters to uniquely identify a vehicle. In an embodiment, the encoding of the location data in the event data to a shape defining the proximity can comprise: geohashing the latitude and longitude to a rectangle whose edges are proportional to the characters in the string.

In an embodiment, the encoding of the location data in the event data to a proximity can further comprise encoding the geohash from 4 to 9 characters.

In an embodiment, the processor is configured to execute the instructions for the method further comprising mapping the geohash to a map database. The mapping can further comprise mapping the geohash to a point of interest database.

In an embodiment, the journey identification comprises identifying an engine on or first vehicle movement for the vehicle; identifying an engine off or stop movement for the vehicle; identifying a dwell time for the vehicle; identifying a minimum distance of travel for the vehicle; and identifying a minimum duration of travel.

In an embodiment, the processor is configured with a minimum duration of travel criterion, and the processor is configured to execute the instructions for identifying the minimum duration of travel for the vehicle using the minimum duration of travel criterion. The minimum duration of travel criterion can be from about 60 to about 90 seconds. In an embodiment, the minimum duration of travel criterion is about 60 seconds.

In an embodiment, the processor is configured with a maximum dwell time criterion, and the processor is configured to execute the instructions for identifying the maximum dwell time for the vehicle using the maximum dwell time criterion. The maximum dwell time criterion can be from about 20 to about 120 seconds. In an embodiment, the maximum dwell time criterion is about 30 seconds.

In an embodiment, the processor is configured with a minimum distance of travel criterion, and the processor is configured to execute the instructions for identifying the minimum distance of travel for the vehicle using the minimum distance of travel criterion. The minimum distance of travel criterion can be from about 100 meters to about 300 meters. In an embodiment, the minimum distance of travel criterion is about 200 meters.

In an embodiment, the journey identification comprises determining that a journey segment does not form part of the journey.

In an embodiment, the system is configured to provide active vehicle detection. The active vehicle detection can comprise identifying a vehicle path from a plurality of the events over a period of time. In an embodiment, the active vehicle detection comprises identifying the vehicle path from the plurality of events over the period of a day, the identification comprising using a connected components algorithm, the connected components algorithm comprising identifying the vehicle path in a directed graph including the day of vehicle events. In the graph, a node is a vehicle and a connection between nodes is the identified vehicle path.

In an embodiment, the system can comprise a data warehouse. The system stores the event data and journey determination data in the data warehouse. In an embodiment, at least one time column can be added to the stored data. The time column can include a date column and an hour column.

At least one embodiment describes a method implemented by a computer including a processor, and a memory including program memory including instructions for executing the methods described above and herein.

At least one embodiment describes a computer program product including program memory including instructions which, when executed by processor, executes the methods described above and herein.

As used herein, a journey can include any trip, run, or travel to a destination.

An exemplary advantage of the systems and methods described herein is optimized low latency that is as of the present disclosure capable of ingesting and processing vehicle event data for up to 600,000 records per second for up to 12 million vehicles.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION OF THE EMBODIMENTS

Various embodiments now will be described more fully hereinafter with reference to the accompanying drawings, which form a part hereof, and which show, by way of illustration, specific embodiments by which the innovations described herein can be practiced. The embodiments can, however, be embodied in many different forms and should not be construed as limited to the embodiments set forth herein. Rather, these embodiments are provided so that this disclosure will be thorough and complete, and will fully convey the scope of the embodiments to those skilled in the art. Among other things, the various embodiments can be methods, systems, media, or devices. The following detailed description is, therefore, not to be taken in a limiting sense.

Throughout the specification and claims, the following terms take the meanings explicitly associated herein, unless the context clearly dictates otherwise. The term "herein" refers to the specification, claims, and drawings associated with the current application. The phrase "in one embodiment" or "in an embodiment" as used herein does not necessarily refer to the same embodiment or a single embodiment, though it can. Furthermore, the phrase "in another embodiment" as used herein does not necessarily refer to a different embodiment, although it can. Thus, as described below, various embodiments can be readily combined, without departing from the scope or spirit of the invention.

In addition, as used herein, the term "or" is an inclusive "or" and is equivalent to the term "and/or" unless the context clearly dictates otherwise. The term "based on" is not exclusive and allows for being based on additional factors not described, unless the context clearly dictates otherwise. In addition, throughout the specification, the meaning of "a" "an" and "the" include plural references. The meaning of "in" includes "in" and "on."

Illustrative Logical System Architecture and System Flows

Figure 1:
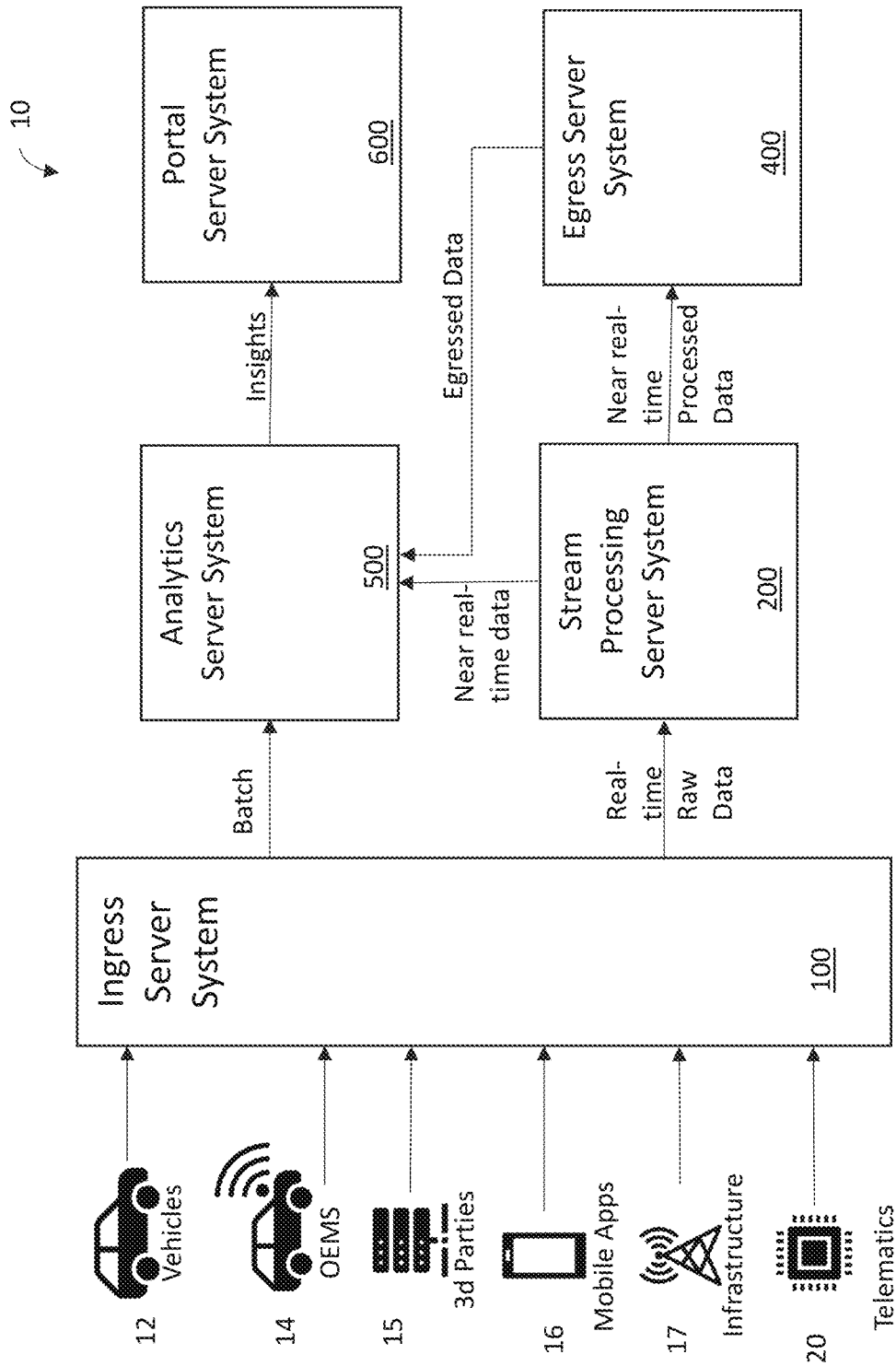
FIG. 1 is a system diagram of an environment in which at least one of the various embodiments can be implemented.

FIG. 1 is a logical architecture of system 10 for geolocation event processing and analytics in accordance with at least one embodiment. In at least one of the various embodiments, Ingress Server system 100 can be arranged to be in communication with Stream Processing Server system 200 and Analytics Server system 500. The Stream Processing Server system 200 can be arranged to be in communication with Egress Server system 400 and Analytics Server system 500.

The Egress Server system 400 can be configured to be in communication with and provide data output to data consumers. The Egress Server system 400 can also be configured to be in communication with the Stream Processing Server 200.

The Analytics Server system 500 is configured to be in communication with and accept data from the Ingress Server system 100, the Stream Processing Server system 200, and the Egress Server system 400. The Analytics Server system 500 is configured to be in communication with and output data to a Portal Server system 600.

In at least one embodiment, Ingress Server system 100, Stream Processing Server system 200, Egress Server system 400, Analytics Server system 500, and Portal Server system 600 can each be one or more computers or servers. In at least one embodiment, one or more of Ingress Server system 100, Stream Processing Server system 200, Egress Server system 400, Analytics Server system 500, and Portal Server system 600 can be configured to operate on a single computer, for example a network server computer, or across multiple computers. For example, in at least one embodiment, the system 10 can be configured to run on a web services platform host such as Amazon Web Services (AWS) or Microsoft Azure. In an exemplary embodiment, the system is configured on an AWS platform employing a Spark Streaming server, which can be configured to perform the data processing as described herein. In an embodiment, the system can be configured to employ a high throughput messaging server, for example, Apache Kafka.

In at least one embodiment, Ingress Server system 100, Stream Processing Server system 200, Egress Server system 400, Analytics Server system 500, and Portal Server system 600 can be arranged to integrate and/or communicate using API's or other communication interfaces provided by the services.

In at least one embodiment, Ingress Server system 100, Stream Processing Server system 200, Egress Server system 400, Analytics Server system 500, and Portal Server system 600 can be hosted on Hosting Servers.

In at least one embodiment, Ingress Server system 100, Stream Processing Server system 200, Egress Server system 400, Analytics Server system 500, and Portal Server system 600 can be arranged to communicate directly or indirectly over a network to the client computers using one or more direct network paths including Wide Access Networks (WAN) or Local Access Networks (LAN).

One of ordinary skill in the art will appreciate that the architecture of system 10 is a non-limiting example that is illustrative of at least a portion of an embodiment. As such, more or less components can be employed and/or arranged differently without departing from the scope of the innovations described herein. However, system 10 is sufficient for disclosing at least the innovations claimed herein.

Figure 2:
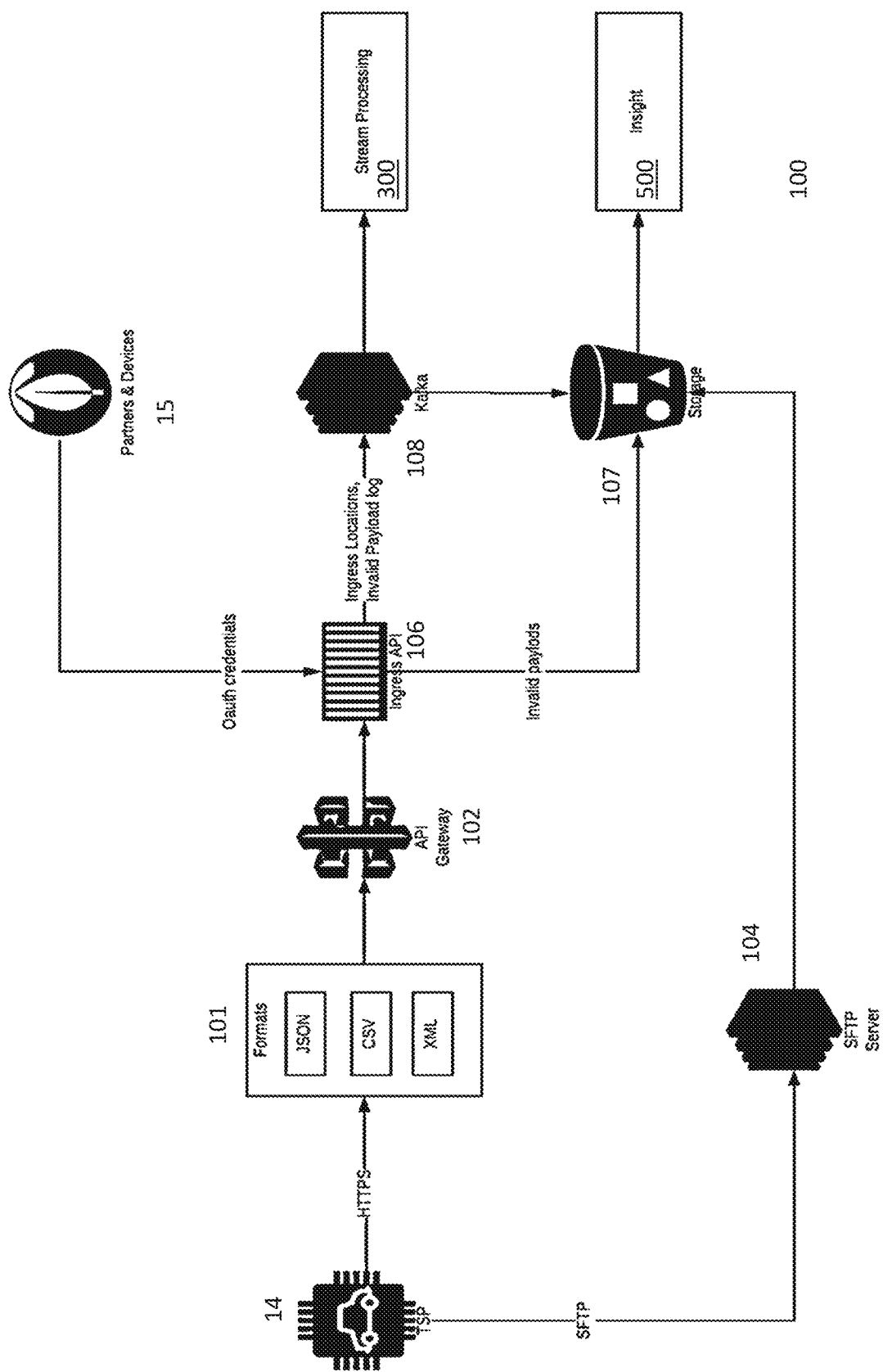
FIG. 2 shows a logical architecture and flowchart for an Ingress Server system in accordance with at least one of the various embodiments of the present disclosure.

Referring to FIG. 2, a logical architecture for an Ingress Server system 100 for ingesting data and data throughput in accordance with at least one embodiment is shown. In at least one embodiment, events from one or more event sources can be determined. In an embodiment, as shown in FIG. 1, event sources can include vehicle sensor data source 12, OEM vehicle sensor data source 14, application data source 16, telematics data source 20, wireless infrastructure data source 17, and third party data source 15 or the like. In at least one embodiment, the determined events can correspond to location data, vehicle sensor data, various user interactions, display operations, impressions, or the like, that can be managed by downstream components of the system, such as Stream Processing Server system 200 and Analytics Server system 500. In at least one embodiment, Ingress Server system 100 can ingress more or fewer event sources than shown in FIGS. 1-2.

In at least one embodiment, events that can be received and/or determined from one or more event sources includes vehicle event data from one or more data sources, for example GPS devices, or location data tables provided by third party data source 15, such as OEM vehicle sensor data source 14. Vehicle event data can be ingested in database formats, for example, JSON, CSV, and XML. The vehicle event data can be ingested via APIs or other communication interfaces provided by the services and/or the Ingress Server system 100. For example, Ingress Server system 100 can offer an API Gateway 102 interface that integrates with an Ingress Server API 106 that enables Ingress Server system 100 to determine various events that can be associated with databases provided by the vehicle event source 14. An exemplary API gateway can include, for example AWS API Gateway. An exemplary hosting platform for an Ingress Server system 100 system can include Kubernetes and Docker, although other platforms and network computer configurations can be employed as well.

In at least one embodiment, the Ingress Server system 100 includes a Server 104 configured to accept raw data, for example, a Secure File Transfer Protocol Server (SFTP), an API, or other data inputs can be configured accept vehicle event data. The Ingress Server system 100 can be configured to store the raw data in data store 107 for further analysis, for example, by an Analytics Server system 500. Event data can include Ignition on, time stamp (T1 . . . TN), Ignition off, interesting event data, latitude and longitude, and Vehicle Information Number (VIN) information. Exemplary event data can include Vehicle Movement data from sources as known in the art, for example either from vehicles themselves (e.g. via GPS, API) or tables of location data provided from third party data sources 15.

In an embodiment, the Ingress Server system 100 is configured to process event data to derive vehicle movement data, for example speed, duration, and acceleration. For example, in an embodiment, a snapshot is taken on the event database every x number of seconds (e.g. 3 seconds). Lat/long data and time data can then be processed to derive vehicle tracking data, such as speed and acceleration, using vehicle position and time.

In an embodiment, the Ingress Server system 100 is configured to accept data from devices and third party platforms. The Ingress Server API 106 can be configured to authenticate devices or third-party platforms and platform hosts to the system 10.

Figure 7:
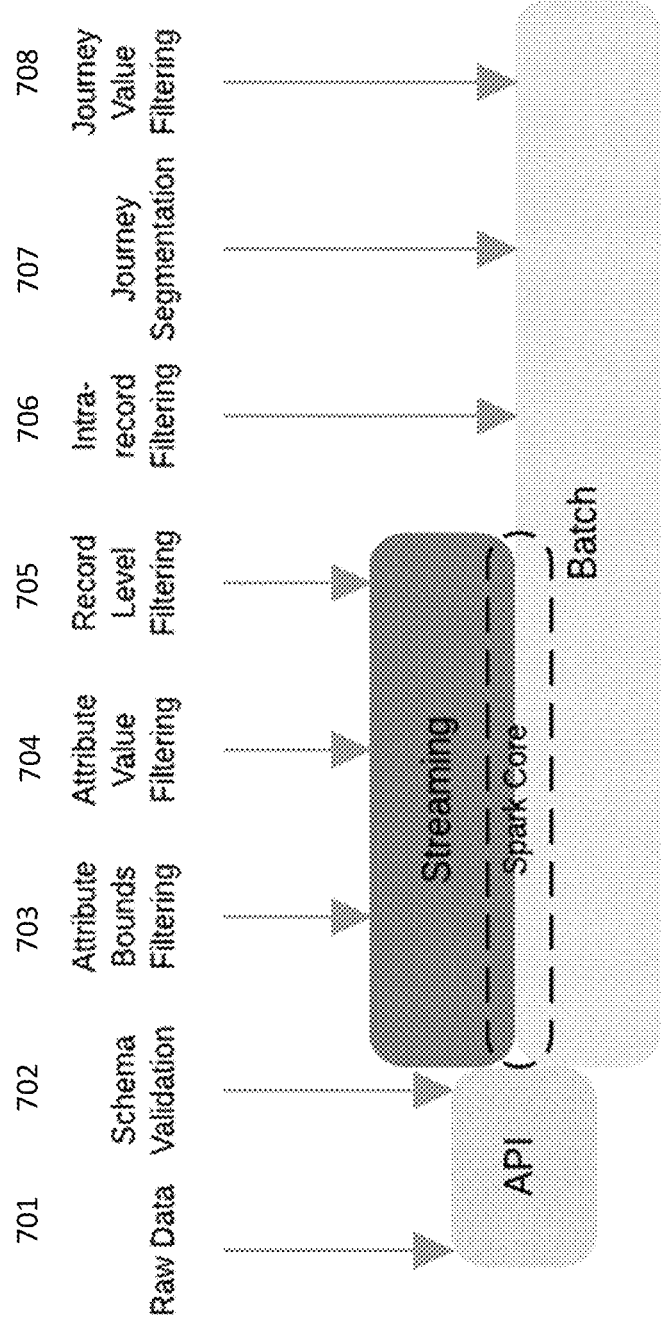
FIG. 7 is a flowchart showing a data quality pipeline of data processing checks for the system.

Accordingly, in an embodiment, the Ingress Server system 100 is configured to receive raw data and perform data quality checks for raw data and schema evaluation. Ingesting and validating raw data is the start of a data quality pipeline of quality checks for the system as shown in FIG. 7 at block 701. Table 1 shows an example of raw data that can be received into the system.

TABLE 1

| | Attribute | Type | Nullable | Description |
|---|---|---|---|---|
| Raw Data | partner_id | Integer | No | Identifier for ingress partner |
| | device_id | String | Yes | 4-9 characters long |
| | captured_timestamp | String | No | Time of an event, expressed in local time with UTC offset |
| | received_timestamp | String | No | Time event was received by Ingress Server, UTC |
| | longitude, latitude | Double | No | WGS84 coordinates of an event |
| | speed | Float | No | Vehicle speed in kilometers per hour recorded at the time of an event |
| | additional | Map | No | Map of string key-value pairs to express data attributes unique to each ingress |
| | journey_id | String | No | An identifier for a journey and the associated events within it |
| | heading | Integer | Yes | Clockwise orientation of vehicle, 0 equals North |
| | altitude | Integer | Yes | Elevation of vehicle as reported by GPS |
| | squish_vin | String | Yes | Encoded representation of vehicle make/model characteristics |
| | ignition_status | String | Yes | Indicator of whether vehicle is under power |

In another embodiment, vehicle event data from an ingress source can include less information. For example, as shown in Table 2, the raw vehicle event data can comprise a limited number of attributes, for example, location data (longitude and latitude) and time data (timestamps).

TABLE 2

| | Attribute | Type | Nullable | Description |
|---|---|---|---|---|
| Raw Data. | captured_timestamp | String | No | Time of an event, expressed in local time with UTC offset |
| | received_timestamp | String | No | Time event was received by Ingress Server, UTC |
| | longitude, latitude | Double | No | WGS84 coordinates of an event |

An exemplary advantage of embodiments of the present disclosure is that information that is absent can be derived from innovative algorithms as described herein. For example, vehicle event data may not include a journey identification, or may have a journey identification that is inaccurate. Accordingly, the system can be configured to derive additional vehicle event attribute data when the initially ingressed data has limited attributes. For example, the system can be configured to identify a specific vehicle for ingressed vehicle event data and append a Vehicle ID. The system can thereby trace vehicle movement—including starts and stops, speed, heading, acceleration, and other attributes using, for example, only location and timestamp data associated with a Vehicle ID.

In an embodiment, at block 702, data received can conform to externally defined schema, for example, Avro or JSON. The data can be transformed into internal schema and validated. In an embodiment, event data can be validated against an agreed schema definition before being passed on to the messaging system for downstream processing by the data quality pipeline. For example, an Apache Avro schema definition can be employed before passing the validated data on to an Apache Kafka messaging system. In another embodiment, the raw movement and event data can also be processed by a client node cluster configuration, where each client is a consumer or producer, and clusters within an instance can replicate data amongst themselves.

For example, the Ingress server system 100 can be configured with a Pulsar Client connected to an Apache Pulsar end point for a Pulsar cluster. In an embodiment, the Apache Pulsar end point keeps track of the last data read, allowing an Apache Pulsar Client to connect at any time to pick up from the last data read. In Pulsar, a "standard" consumer interface involves using "consumer" clients to listen on topics, process incoming messages, and finally acknowledge those messages when the messages have been processed. Whenever a client connects to a topic, the client automatically begins reading from the earliest unacknowledged message onward because the topic's cursor is automatically managed by a Pulsar Broker module. However, a client reader interface for the client enables the client application to manage topic cursors in a bespoke manner. For example, a Pulsar client reader can be configured to connect to a topic to specify which message the reader begins reading from when it connects to a topic. When connecting to a topic, the reader interface enables the client to begin with the earliest available message in the topic or the latest available message in the topic. The client reader can also be configured to begin at some other message between the earliest message and the latest message, for example by using a message ID to fetch messages from a persistent data store or cache.

In at least one embodiment, the Ingress Server system 100 is configured to clean and validate data. For example, the Ingress Server system 100 can be configured include an Ingress Server API 106 that can validate the ingested vehicle event and location data and pass the validated location data to a server queue 108, for example, an Apache Kafka queue 108, which is then outputted to the Stream Processing Server system 200. Server 104 can be configured to output the validated ingressed location data to the data store 107 as well. The Ingress Server system 100 can also be configured to pass invalid data to a data store 107. For example, invalid payloads can be stored in data store 107. Exemplary invalid data can include, for example, data with bad fields or unrecognized fields, or identical events. The Ingress Server system 100 can be configured to output the stored invalid data or allow stored data to be pulled to the Analysis Server system 500 from the data store 107 for analysis, for example, to improve system performance. For example, the Analysis Server system 500 can be configured with diagnostic machine learning configured to perform analysis on databases of invalid data with unrecognized fields to newly identify and label fields for validated processing. The Ingress Server system 100 can also be configured to pass stored ingressed location data for processing by the Analytics Server system 500, for example, for Journey analysis as described herein.

As described herein, the system 10 is configured to processes data in both a streaming and a batch context. In the streaming context, low latency is more important than completeness, i.e. old data need not be processed, and in fact, processing old data can have a detrimental effect as it may hold up the processing of other, more recent data. In the batch context, completeness of data is more important than low latency. Accordingly, to facilitate the processing of data in these two contexts, in an embodiment, the system can default to a streaming connection that ingresses all data as soon as it is available but can also be configured to skip old data. A batch processor can be configured to fill in any gaps left by the streaming processor due to old data.

Figure 3:
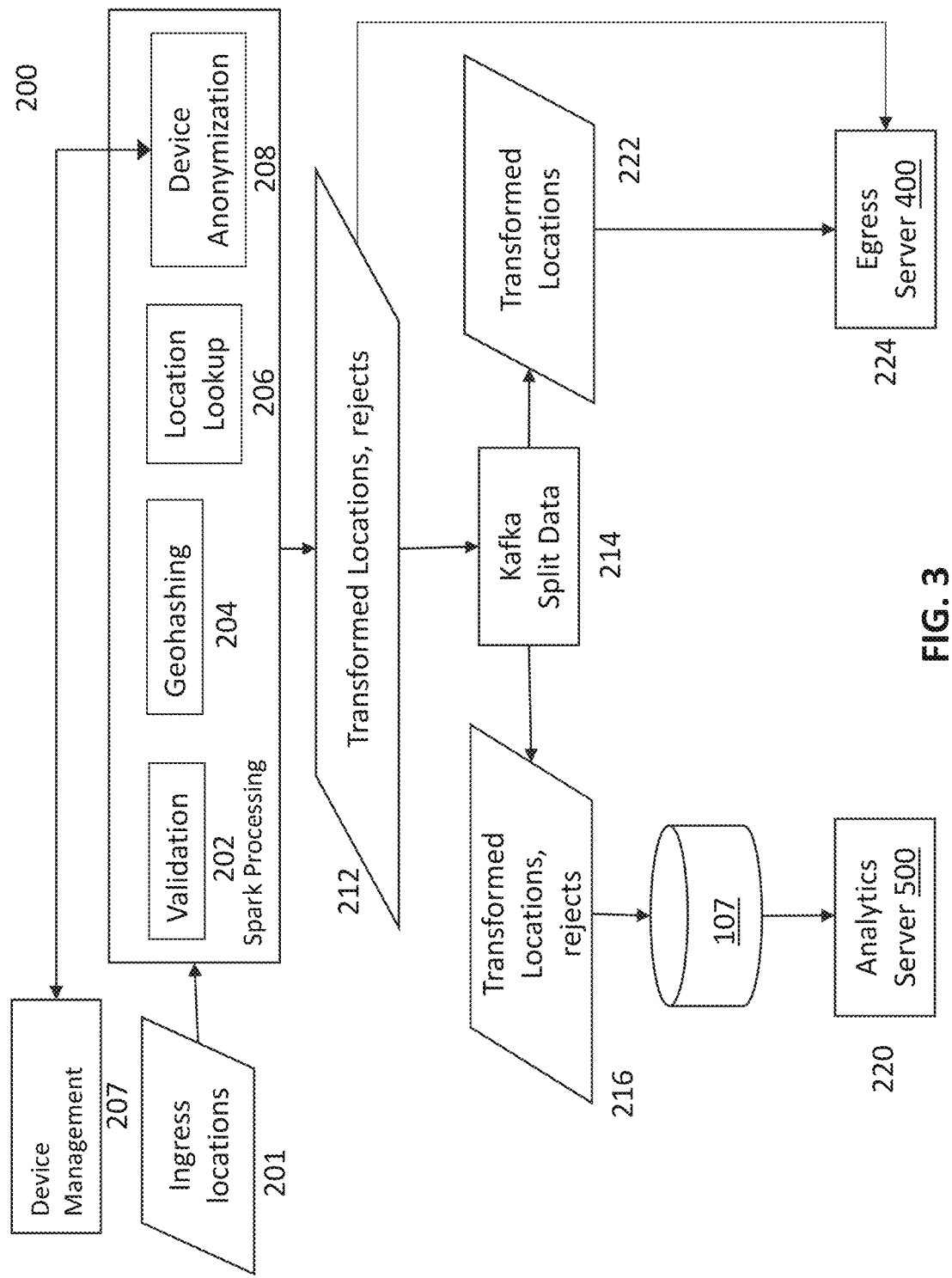
FIG. 3 shows a logical architecture and flowchart for a Stream Processing Server system in accordance with at least one of the various embodiments.

FIG. 3 is a logical architecture for a Stream Processing Server system 200 for data throughput and analysis in accordance with at least one embodiment. Stream processing as described herein results in system processing improvements, including improvements in throughput in linear scaling of at least 200 k to 600 k records per second. Improvement further includes end-to-end system processing of 20 seconds, with further improvements to system latency being ongoing. In at least one embodiment, the system can be configured to employ a server for micro-batch processing. For example, as described herein, in at least one embodiment, the Stream Processing Server system 200 can be configured to run on a web services platform host such as AWS employing a Spark Streaming server and a high throughput messaging server such as Apache Kafka. In an embodiment, the Stream Processing Server system 200 can include Device Management Server 207, for example, AWS Ignite, which can be configured input processed data from the data processing server. The Device Management Server 207 can be configured to use anonymized data for individual vehicle data analysis, which can be offered or interfaced externally. The system 10 can be configured to output data in real time, as well as to store data in one or more data stores for future analysis. For example, the Stream Processing Server system 200 can be configured to output real time data via an interface, for example Apache Kafka, to the Egress Server system 400. The Stream Processing Server system 200 can also be configured to store both real-time and batch data in the data store 107. The data in the data store 107 can be accessed or provided to the Insight Server system 500 for further analysis.

In at least one embodiment, event information can be stored in one or more data stores 107, for later processing and/or analysis. Likewise, in at least one embodiment, event data and information can be processed as it is determined or received. Also, event payload and process information can be stored in data stores, such as data store 107, for use as historical information and/or comparison information and for further processing.

In at least one embodiment, the Stream Processing Server system 200 is configured to perform vehicle event data processing.

FIG. 3 illustrates a logical architecture and overview flowchart for a Steam Processing Server system 200 in accordance with at least one embodiment. At block 202, the Stream Processing Server system 200 performs validation of location event data from ingressed locations 201. Data that is not properly formatted, is duplicated, or is not recognized is filtered out. Exemplary invalid data can include, for example, data with bad fields, unrecognized fields, or identical events (duplicates) or engine on/engine off data points occurring at the same place and time. The validation also includes a latency check, which discards event data that is older than a predetermined time period, for example, 7 seconds. In an embodiment, other latency filters can be employed, for example between 4 and 15 seconds.

In an embodiment, as shown at block 703 of FIG. 7, the Stream Processing Server system 200 is configured perform Attribute Bounds Filtering. Attribute Bounds Filtering checks to ensure event data attributes are within predefined bounds for the data that is meaningful for the data. For example, a heading attribute is defined as a circle (0→359). A squish-vin is a 9-10 character VIN. Examples include data that is predefined by a data provider or set by a standard. Data values not within these bounds indicate the data is inherently faulty for the Attribute. Non-conforming data can be checked and filtered out. An example of Attribute Bounds Filtering is given in Table 3.

TABLE 3

| Attribute Bounds Filtering | Attribute | Units | Defined by | Bounds | Data Points Flagged | Data Points Flagged (%) |
|---|---|---|---|---|---|---|
| Values within meaningful range. | Attributes contain only values within externally predefined boundaries. | device_id | String | Externally | N/A | 27 | 0.00171% |
| | | longitude, latitude | Double | Internally | to spec | 586 | 586 |
| | | heading | Integer | Externally | 0 → 359 | 94 | 0.00004% |
| | | squish_vin | String | Externally | 9-10 characters | 0 | 0% |

In an embodiment, at block 704 the system is configured to perform Attribute Value Filtering. Attribute Value Filtering checks to ensure attribute values are internally set or bespoke defined ranges. For example, while a date of 1970 can pass an Attribute Bounds Filter check for a date Attribute of the event, the date is not a sensible value for vehicle tracking data. Accordingly, Attribute Value Filtering is configured to filter data older than a predefined time, for example 6 weeks or older, which can be checked and filtered. An example Attribute Bounds Filtering is given in Table 3.

TABLE 3

| Attribute Value Filtering | Attribute | Units | Defined by | Defined Bounds | Data Points Flagged | Data Points Flagged (%) |
|---|---|---|---|---|---|---|
| Values within reasonable range. | Attributes contain only values within internally defined boundaries. | captured_timestamp | Timestamp | | <6 weeks ago | 64296 | |
| | | received_timestamp | Timestamp | | >now | 0 | |
| | | longitude, latitude | degrees | Internally | bounding box | 0 | |
| | | speed | kph | Internally | 0 → 360 | 0 | |
| | | altitude | metres | Internally | −1000 → 10000 | | |

At block 705, the system can perform further validation on Attributes in a record to confirm that relationships between attributes of record data points are coherent. For example, a non-zero trip start event does not make logical sense for a Journey determination as described herein. Accordingly, as shown in Table 4, the system 10 can be configured to filter non-zero speed events recorded for the same Attributes for a captured timestamp and a received timestamp for a location as "TripStart" or Journey ignition on start event.

TABLE 4

| Record-Level Filtering | Attributes | Conditions | Data Points Flagged | Data Points Flagged (%) |
|---|---|---|---|---|
| Row contents have semantic meaning. | speed, ignition_status | speed > 0 AND ignition_status IN ('KEY_OFF', 'KEY_ON') | 439 | 0.0004% |
| | captured_timestamp, received_timestamp | received_timestamp < captured_timestamp | 41 | 0.00004% |

Returning to FIG. 2, at block 204, in at least one embodiment, the Stream Processing Server 200 performs geohashing of the location event data. While alternatives to geohashing are available, such as an H3 algorithm as employed by Uber™, or a S2 algorithm as employed by Google™, it was found that geohashing provided exemplary improvements to the system 10, for example improvements to system latency and throughput. Geohashing also provided for database improvements in system 10 accuracy and vehicle detection. For example, employing a geohash to 9 characters of precision can allow a vehicle to be uniquely associated the geohash. Such precision can be employed in Journey determination algorithms as described herein. In at least one embodiment, the location data in the event data is encoded to a proximity, the encoding comprising geohashing latitude and longitude for each event to a proximity for each event. The event data comprises time, position (lat/long), and event of interest data. Event of interest data can include harsh brake and harsh acceleration. For example, a harsh brake can be defined as a deceleration in a predetermined period of time (e.g. 40-0 in x seconds), and a harsh acceleration is defined as an acceleration in a predetermined period of time (e.g. 40-80 mph in x seconds). Event of interest data can be correlated and processed for employment in other algorithms. For example, a cluster of harsh brakes mapped in location to a spatiotemporal cluster can be employed as a congestion detection algorithm.

The geohashing algorithm encodes latitude and longitude (lat/long) data from event data to a short string of n characters. In an embodiment, the geohashed lat/long data is geohashed to a shape. For example, in an embodiment, the lat/long data can be geohashed to a rectangle whose edges are proportional to the characters in the string. In an embodiment, the geohash can be encoded from to 4 to 9 characters.

A number of advantages flow from employing geohashed event data as described herein. For example, in a database, data indexed by geohash will have all points for a given rectangular area in contiguous slices, where the number of slices is determined by the geohash precision of encoding. This improves the database by allowing queries on a single index, which is much easier or faster than multiple-index queries. The geohash index structure is also useful for streamlined proximity searching, as the closest points are often among the closest geohashes.

At block 206, in at least one embodiment, the Stream Processing Server system 200 performs a location lookup. As noted above, in an embodiment, the system can be configured to encode the geohash to identify a defined geographical area, for example, a country, a state, or a zip code. The system can geohash the lat/long to a rectangle whose edges are proportional to the characters in the string.

For example, in an embodiment, the geohashing can be configured to encode the geohash to 5 characters, and the system can be configured to identify a state to the 5-character geohashed location. For example, the geohash encoded to 5 slices or characters of precision is accurate to +/−2.5 kilometers, which is sufficient to identify a state. A geohash to 6 characters can be used to identify the geohashed location to a zip code, as it is accurate to +/−0.61 kilometers. A geohash to 4 characters can be used to identify a country. In an embodiment, the system 10 can be configured to encode the geohash to uniquely identify a vehicle with the geohashed location. In an embodiment, the system 10 can be configured to encode the geohash to 9 characters to uniquely identify a vehicle.

In an embodiment, the system 10 can be further configured to map the geohashed event data to a map database. The map database can be, for example, a point of interest database or other map database, including public or proprietary map databases. Exemplary map databases can include extant street map data such as Geofabric for local street maps, or World Map Database. An exemplary advantage of employing geohashing as described herein is that it allows for much faster, low latency enrichment of the vehicle event data when processed downstream. For example, geographical definitions, map data, and other enrichments are easily mapped to geohashed locations and Vehicle IDs. Feed data can be also be combined into an aggregated data set and visualized using an interface, for example a GIS visualization tool (e.g.: Mapbox, CARTO, ArcGIS, or Google Maps API) or other interfaces to produce and interface graphic reports or to output reports to third parties 15 using the data processed to produce the analytics insights, for example, via the Egress Server system 400 or Portal Server system 600.

In at least one embodiment, at block 208, the Stream Processor Server system 200 can be configured to anonymize the data to remove identifying information, for example, by removing or obscuring personally identifying information from a Vehicle Identification Number (VIN) for vehicle data in the event data. In various embodiments, event data or other data can include VIN numbers, which include numbers representing product information for the vehicle, such as make, model, and year, and also includes characters that uniquely identify the vehicle, and can be used to personally identify it to an owner. The system 10 can include, for example, an algorithm that removes the characters in the VIN that uniquely identify a vehicle from vehicle data but leaves other identifying serial numbers (e.g. for make, model and year), for example, a Squish Vin algorithm. In an embodiment, the system 10 can be configured to add a unique vehicle tag to the anonymized data. For example, the system 10 can be configured to add unique numbers, characters, or other identifying information to anonymized data so the event data for a unique vehicle can be tracked, processed and analyzed after the personally identifying information associated with the VIN has been removed. An exemplary advantage of anonymized data is that the anonymized data allows processed event data to be provided externally while still protecting personally identifying information from the data, for example as may be legally required or as may be desired by users.

In at least one embodiment, as described herein, a geohash to 9 characters can also provide unique identification of a vehicle without obtaining or needing personally identifying information such as VIN data. Vehicles can be identified via processing a database event data and geohashed to a sufficient precision to identify unique vehicles, for example to 9 characters, and the vehicle can then be identified, tracked, and their data processed as described herein.

As noted above, for real-time streaming, at block 202, the data validation filters out data that has excess latency, for example a latency over 7 seconds. However, batch data processing can run with a full set of data without gaps, and thus can include data that is not filtered for latency. For example, a batch data process for analytics as described with respect to FIG. 5 can be configured to accept data up to 6 weeks old, whereas the streaming stack of Stream Processing Server system 200 is configured to filter data that is over 7 seconds old, and thus includes the latency validation check at block 202 and rejects events with higher latency.

In an embodiment, at block 212, both the transformed location data filtered for latency and the rejected latency data are input to a server queue, for example, an Apache Kafka queue. At block 214, the Stream Processing server system 200 cab split the data into a data set including full data 216—the transformed location data filtered for latency and the rejected latency data—and another data set of the transformed location data 222. The full data 216 is stored in data store 107 for access or delivery to the Analytics Server system 500, while the filtered transformed location data is delivered to the Egress Server system 400. In another embodiment, the full data set or portions thereof including the rejected data can also be delivered to the Egress Server system 400 for third party platforms for their own use and analysis. In such an embodiment, at block 213 transformed location data filtered for latency and the rejected latency data can be provided directly to the Egress Server system 400.

Figure 4:
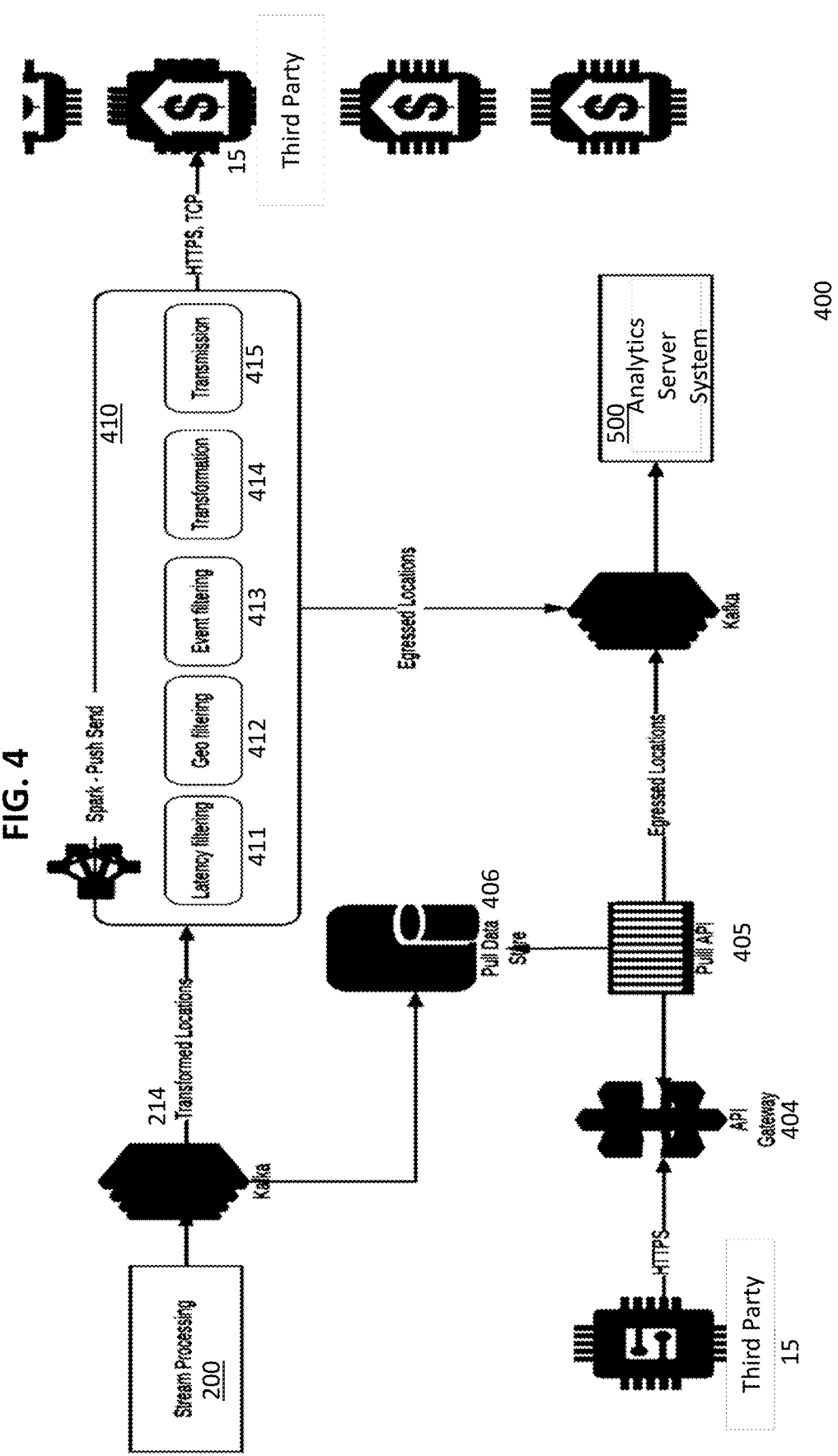
FIG. 4 represents a logical architecture and flowchart for an Egress Server system in accordance with at least one of the various embodiments.

FIG. 4 is a logical architecture for and Egress Server system 400. In at least one embodiment, Egress Server system 400 can be one or more computers arranged to ingest, throughput records, and output event data. The Egress Server system 400 can be configured to provide data on a push or pull basis. For example, in an embodiment, the system 10 can be configured to employ a push server 410 from an Apache Spark Cluster. The push server can be configured to process transformed location data from the Stream Process Server system 200, for example, for latency filtering 411, geo filtering 412, event filtering 413, transformation 414, and transmission 415. As described herein, geohashing improves system 10 throughput latency considerably, which allows for advantages in timely push notification for data processed in close proximity to events, for example within minutes and even seconds. For example, in an embodiment, the system 10 is configured to target under 60 seconds of latency. As noted above, Stream Processing Server system 200 is configured to filter events with a latency of less than 7 seconds, also improving throughput. In an embodiment, a data store 406 for pull data can be provided via an API gateway 404, and a Pull API 405 can track which third part 15 users are pulling data and what data users are asking for.

For example, in an embodiment, the Egress Server system 400 can provide pattern data based on filters provided by the system 10. For example, the system can be configured to provide a geofence filter 412 to filter event data for a given location or locations. As will be appreciated, geofencing can be configured to bound and process journey and event data as described herein for numerous patterns and configurations. For example, in an embodiment, the Egress Server system 400 can be configured to provide a "Parking" filter configured restrict the data to the start and end of journey (Ignition—key on/off events) within the longitude/latitudes provided or selected by a user. Further filters or exceptions for this data can be configured, for example by state (state code or lat/long). The system 10 can also be configured with a "Traffic" filter to provide traffic pattern data, for example, with given states and lat/long bounding boxes excluded from the filters.

Figure 5:
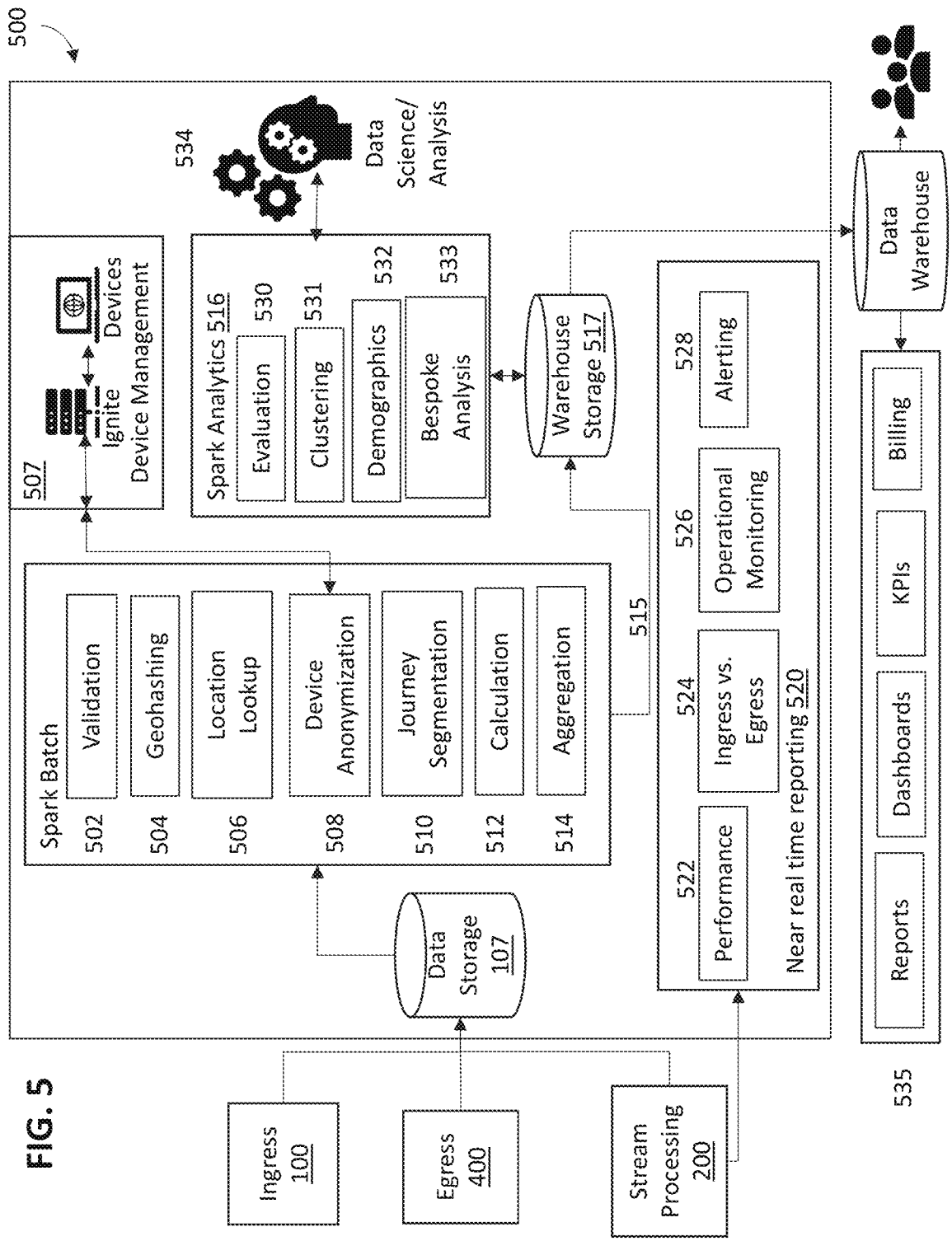
FIG. 5 illustrates a logical architecture and flowchart for a process for an Analytics Server system in accordance with at least one of the various embodiments.

FIG. 5 represents a logical architecture for an Analytics Server system 500 for data analytics and insight. In at least one embodiment, Analytics Server system 500 can be one or more computers arranged to analyze event data. Both real-time and batch data can be passed to the Analytics Server system 500 for processing from other components as described herein. In an embodiment, a cluster computing framework and batch processor, such as an Apache Spark cluster, which combines batch and streaming data processing, can be employed by the Analytics Server system 500. Data provided to the Analytics Server system 500 can include, for example, data from the Ingress Server system 100, the Stream Processing Server system 200, and the Egress Server system 400.

In an embodiment, the Analytics Server system 500 can be configured to accept vehicle event payload and processed information, which can be stored in data stores, such as data stores 107. As shown in FIG. 5, the storage includes real-time egressed data from the Egress Server system 400, transformed location data and reject data from the Stream Processing Server system 200, and batch and real-time, raw data from the Ingress Server system 100. As shown in FIG. 2, ingressed locations stored in the data store 107 can be output or pulled into the Analytics Server system 500. The Analytics Server system 500 can be configured to process the ingressed location data in the same way as the Stream Processor Server system 200 as shown in FIG. 2. As noted above, the Stream Processing Server system 200 can be configured to split the data into a full data set 216 including full data (transformed location data filtered for latency and the rejected latency data) and a data set of transformed location data 222. The full data set 216 is stored in data store 107 for access or delivery to the Analytics Server system 500, while the filtered transformed location data is delivered to the Egress Server system 400. As shown in FIG. 5, real time filtered data can be processed for reporting in near real time, including reports for performance 522, Ingress vs. Egress 524, operational monitoring 526, and alerts 528.

Accordingly, at block 502 of FIG. 5, in at least one embodiment, the Analytics Processing Server system 500 can be configured to optionally perform validation of raw location event data from ingressed locations in the same manner as shown with block 202 in FIG. 2 and blocks 701-705 of FIG. 7. In an embodiment, as shown in FIG. 7, at block 706, the system 10 can employ batch processing of records to perform further validation on Attributes for multiple event records to confirm that intra-record relationships between attributes of event data points are meaningful. For example, as shown in Table 5, the system 10 can be configured to analyze data points analyzed to ensure logical ordering of events for a journey (e.g.: journey events for a journey alternate "TripStart-TripEnd-TripStart" and do not repeat "TripStart-TripStart-TripEnd-TripEnd).

TABLE 5

| Intra-Record Filtering | Attributes | Conditions | Data Points Flagged | Data Points Flagged (%) |
|---|---|---|---|---|
| Record ordering logical. | ignition_status | LEAD(ignition_status) = ignition_status AND ignition_status <> 'MID_JOURNEY' | 9125 | 0.0035% |

Referring to block 504 of FIG. 5, in at least one embodiment, the Analytics Server system 500 can optionally be configured to perform geohashing of the location event data as shown in FIG. 2, block 204. At block 506 of FIG. 5, the Analytics Server system 500 can optionally perform location lookup. At block 508 of FIG. 5, the Analytics Server system 500 can be configured to optionally perform device anonymization as shown in blocks 206 and 208 of FIG. 2.

At block 510, in at least one embodiment, the Analytics Server system 500 performs a Journey Segmentation analysis of the event data. In an embodiment, the system 10 is configured to identify a Journey for a vehicle from the event data, including identifying whether a given vehicle's route or movement is for purposes of driving to a journey destination, wherein the journey identification comprises: identifying an engine on or a first movement for the vehicle; identifying an engine off or stop movement for the vehicle; identifying a dwell time for a vehicle; and identifying a minimum duration of travel.

In at least one embodiment, a Journey can comprise one or more Journey Segments from a starting point to a final destination. A Journey Segment comprises a distance and a duration of travel between engine on/start movement and engine off/stop movement events for a vehicle.

However, a real driver may have one or more stops when travelling to a destination. A Journey can have two or more Journey Segments, such as when there is a trip with multiple stops. For example, a driver may need to stop for fuel when travelling from home to work or stop at a traffic light. As such, a problem and challenge in vehicle event analysis includes developing accurate vehicle tracking for embodiments as described herein. While other Journey algorithms or processes have been employed in the art, for example reverse engineering a journey from a known destination of an identified vehicle, the present disclosure includes embodiments and algorithms that have been developed and advantageously implemented for agnostic vehicle tracking using the technology described herein, including the data analysis, databases, interfaces, data processing, and other technological products.

At block 512, the Analytics Server 500 is configured to perform calculations to qualify a Journey from event information. In an embodiment, the system 10 is configured with Journey detection criteria, including a duration criterion, a distance criterion, and a dwell time criterion. In at least one embodiment, the duration criterion includes a minimum duration criterion, where a minimum duration of travel is required for the system to include a Journey Segment in a Journey. A minimum duration of travel after engine on or a start movement can comprise a duration of time for travel, for example, from about 60 to about 90 seconds. In an exemplary embodiment, the system 10 can be configured require a vehicle travel more than 60 seconds for it to be included as a Journey Segment. For example, if an (1) engine on/ignition event or (2) an identified vehicle's first movement after a known last movement (e.g. from a previous trip or journey) or (3) a newly identified vehicle's first movement is identified for a vehicle, and the event is followed by a short duration of travel of less than 60 seconds, the system 10 is configured to exclude this Journey Segment from a Journey determination. The system 10 is configured to determine that the vehicle's short duration of movement is not a Journey start or destination.

In an embodiment, the Journey detection criterion includes a distance of travel criterion, for example 200 meters. The system 10 can be configured to exclude distances of 200 meters or less from a Journey segment. A minimum distance of travel criterion can comprise a predetermined duration of distance for travel, for example, from about 100 meters to about 300 meters. The minimum distance x (e.g. 200 meters) can be defined to an index including about 50% tolerance of the minimum distance x.

In an embodiment, a dwell time criterion can include a stop time for a vehicle. For example, a dwell time criterion can be from about 30 to about 90 seconds. A maximum dwell time can comprise a duration of stopping between an engine off/stop movement and engine on/start movement for the same vehicle, for example, from about 20 to about 120 seconds. For example, if the system 10 determines a vehicle is stopped or its engine is off for less than 30 seconds, the system can be configured not to include that stop period as the end of a Journey or in a Journey object.

As described above, in an embodiment, the system 10 is configured to process vehicle event data to determine if one or more Journey Segments comprise a Journey for a vehicle. For example, an engine on or start movement event can be followed by a distance exceeding a distance criterion (e.g. over 200 meters). Thus, the system's duration criterion does identify this segment for a Journey. However, if the car stops thereafter and continues to stay stationary for over 30 seconds, the system 10 is configured not to count that as a segment for a Journey. If the vehicle subsequently stops for less than 30 seconds and then moves again, the Dwell time criterion is met, and the system 10 is configured to include that Journey Segment in the Journey for that vehicle's travel to its final destination. Thus, the algorithm can join a plurality of Journey Segments for a Journey or a Journey object for an everyday real time drive a destination, for example, when a driver turns a car on (engine on/start movement) at home, drives for 10 miles (Distance criterion), stops at a stop light for 29 seconds, travels on to a final destination at work (engine off/stop movement). However, the system 10 is configured to ignore events that are unlikely to represent an interruption in a Journey, for example stopping at a stop light for 29 seconds (Dwell criterion) or movement less than 200 meters (Distance criterion) or less than 60 seconds (Duration criterion).

In an embodiment, the system 10 can include a plurality of criteria for each of the dwell criterion, the distance criterion, or the time criterion, for example, based on variable data. Thus, the algorithm can join a plurality of Journey Segments for a Journey for a common real time drive to a destination where additional data is known about the vehicle and the location. For example, if a vehicle is identified as a road legal electric vehicle such as an electric car, the dwell criteria can include a dwell time maximum criterion of 20 minutes at a location identified as an electric charging station. Thus, the dwell time can be extended up to between 2-20 minutes, based on, for example, other data about the location (e.g., data indicating the stop is a point of interest such as a gas station, rest area, or restaurant). The system 10 can be configured to identify a Journey when a driver of an electric car turns the car on (engine on or first movement) at home, drives for 100 miles (Distance criterion) to a charging station for charging (engine off/stop movement, 12 minutes, Dwell criterion, variable, charging station), then starts again (engine on/start movement) and travels on to a final destination at a sales meeting (engine off/stop movement). Accordingly, as will be appreciated, each of the criteria above can be configured to be variable depending on, inter alia, knowledge derived or obtained about an event vehicle data point.

In an embodiment, the system 10 is configured to identify candidate chains of Journey segments for a given device according to the criteria described above. Also, a compound Journey object can be instantiated with its start being the beginning of the chain and its end being the end of the final segment in the chain. A separate table of Journey objects can be extracted from event data and derived compound Journeys can be generated into a further table. In an embodiment, a data set including all engine on/engine off or start movement/stop movement events are identified to a unique vehicle ID. For example, each of the engine on/engine off or start movement/stop movement events for a vehicle can be placed on a single row including the candidate Journey segments. Then, row of engine on/engine off or start movement/stop movement events can be processed by each of the distance criterion, duration criterion, and dwell criterion to determine which Journey segments can be included or excluded from a Journey determination for a Journey object. In an embodiment, the system 10 can generate a further Journey Table, which is populated with Journey objects as determined from the events for the vehicle that meet the Journey criteria above.

In at least one embodiment, at block 514, the system 10 is configured to provide active vehicle detection by analyzing a database of vehicle event data and the summarizing of a journey of points into a Journey object with attributes, such as start time, end time, start location, end location, data point count, average interval and the like. In an embodiment, Journey objects can be put into a separate data table for processing.

In an exemplary embodiment, the system 10 can be configured to perform vehicle tracking without the need for pre-identification of the vehicle (e.g. by a VIN number). As described above, geohashing can be employed on a database of event data to geohash data to a precision of 9 characters, which corresponds to a shape sufficient to uniquely correlate the event to a vehicle. In an embodiment, the active vehicle detection comprises identifying a vehicle path from a plurality of the events over a period of time. In an embodiment, the active vehicle detection can comprise identifying the vehicle path from the plurality of events over the period of a day (24 hours). The identification comprises using, for example, a connected components algorithm. In an embodiment, the connected components algorithm is employed to identify a vehicle path in a directed graph including the day of vehicle events, in which in the graph, a node is a vehicle and a connection between nodes is the identified vehicle path. For example, a graph of journey starts and journey ends is created, where nodes represent starts and ends, and edges are journeys undertaken by a vehicle. At each edge, starts and ends are sorted temporally. Edges are created to connect ends to the next start at that node, ordered by time. Nodes are 9 digit geohashes of GPS coordinates. A connected components algorithm finds the set of nodes and edges that are connected and, a generated device ID at the start of a day is passed along the determined subgraph to uniquely identify the journeys (edges) as being undertaken by the same vehicle.

An exemplary advantage of this approach is it obviates the need for pre-identification of vehicles to event data. Journey Segments from vehicle paths meeting Journey criteria as described herein can be employed to detect Journeys and exclude non-qualifying Journey events as described above. For example, a geohash encoded to 9 digits (highest resolution) for event data showing a vehicle had a stop movement/engine off to start movement/engine on event within x seconds of each other (30 seconds) can be deemed the same vehicle for a Journey. For a sequence of arrives and leaves, a Journey can be calculated as the shortest path of Journey Segments through the graph.

In at least one embodiment, at block 515, the system 10 can be configured to store the event data and Journey determination data in a data warehouse 517. Data can be stored in a database format. In an embodiment, a time column can be added to the processed data. In an embodiment, the database can also comprise Point of Interest (POI) data.

The Analytics Server system 500 can include an analytics server component 516 to perform data analysis on data stored in the data warehouse 517, for example a Spark analytics cluster. The Analytics Server system 500 can be configured to perform evaluation 530, clustering 531, demographic analysis 532, and bespoke analysis 533. For example, a date column and hour column can be added to data to processed Journey data and location data stored in the warehouse 517. This can be employed for bespoke analysis 533, for example, determining how many vehicles at intersection x by date and time. The system 10 can also be configured to provide bespoke analysis 533 at the Egress Server system 400, as described with respect to FIG. 4.

In an embodiment, a geospatial index row can be added to stored warehouse 517 data, for example, to perform hyper local targeting or speeding up ad hoc queries on geohashed data. For example, location data resolved to 4 decimals or characters can correspond to a resolution of 20 meters or under.

The Analytics Server system 500 can be configured with diagnostic machine learning 534 configured to perform analysis on databases of invalid data with unrecognized fields to newly identify and label fields for validated processing.

In an embodiment, the system 10 can be configured to perform batch analysis of Journey segmentation as described at block 510. For example, at block 707 of FIG. 7, journey segmentation extraction can include simple extraction of Journeys by identifying all events marked with a unique ID. An example of a journey segmentation extraction and count is shown in Table 6.

TABLE 6

| | Metric | Total |
|---|---|---|
| Journey Segmentation | Count of extracted journeys | 294567 |

The system 10 can also be configured to perform calculations to qualify a Journey from event information using the Journey criteria as described at block 512 for Journey Value Filtering at block 708 of FIG. 7. An example of Journey Value Filtering is shown at Table 7.

TABLE 7

| Journey Value Filtering | Metric | Defined by | Total | Total (% of journeys) |
|---|---|---|---|---|
| Duration, distance, dwell within bounds. | Journeys shorter than 60 seconds | Internal | 67255 | 0.228318 |
| | Journeys less than 200 meters in length | Internal | 140317 | 0.47635 |
| | Journeys with a dwell time below 30 seconds | Internal | 12955 | 0.04398 |
| | Journeys that appear to be outliers based on inter-quartile range check | Internal | 80647 | 0.273782 |

In an embodiment, batch data can be processed for system performance reporting 535. For example, in an embodiment, the system 10 can be configured to produce reports for system latency. An example of batch analysis latency reporting against a range of percentiles between captured and received timestamp data as shown in Table 8. The system 10 can be configured to perform interval analysis of the latent data. An example of the interval/capture rate reporting against a range of percentiles is shown in Table 9.

TABLE 8

| Latency Analysis | Percentile | Latency at the percentile (secs) |
|---|---|---|
| The delay captured and timestamp split into percentiles | 10th Percentile | n |
| | 20th Percentile | n |
| | 30th Percentile | n |
| | 40th Percentile | n |
| | 50th Percentile | n |
| | 60th Percentile | n |
| | 70th Percentile | n |
| | 80th Percentile | n |
| | 90th Percentile | n |

TABLE 9

| Interval Analysis | Percentile | Capture Rate at the percentile (secs) |
|---|---|---|
| The intervals split into percentiles | 10th Percentile | n |
| | 20th Percentile | n |
| | 30th Percentile | n |
| | 40th Percentile | n |
| | 50th Percentile | n |
| | 60th Percentile | n |
| | 70th Percentile | n |
| | 80th Percentile | n |
| | 90th Percentile | n |

Figure 6:
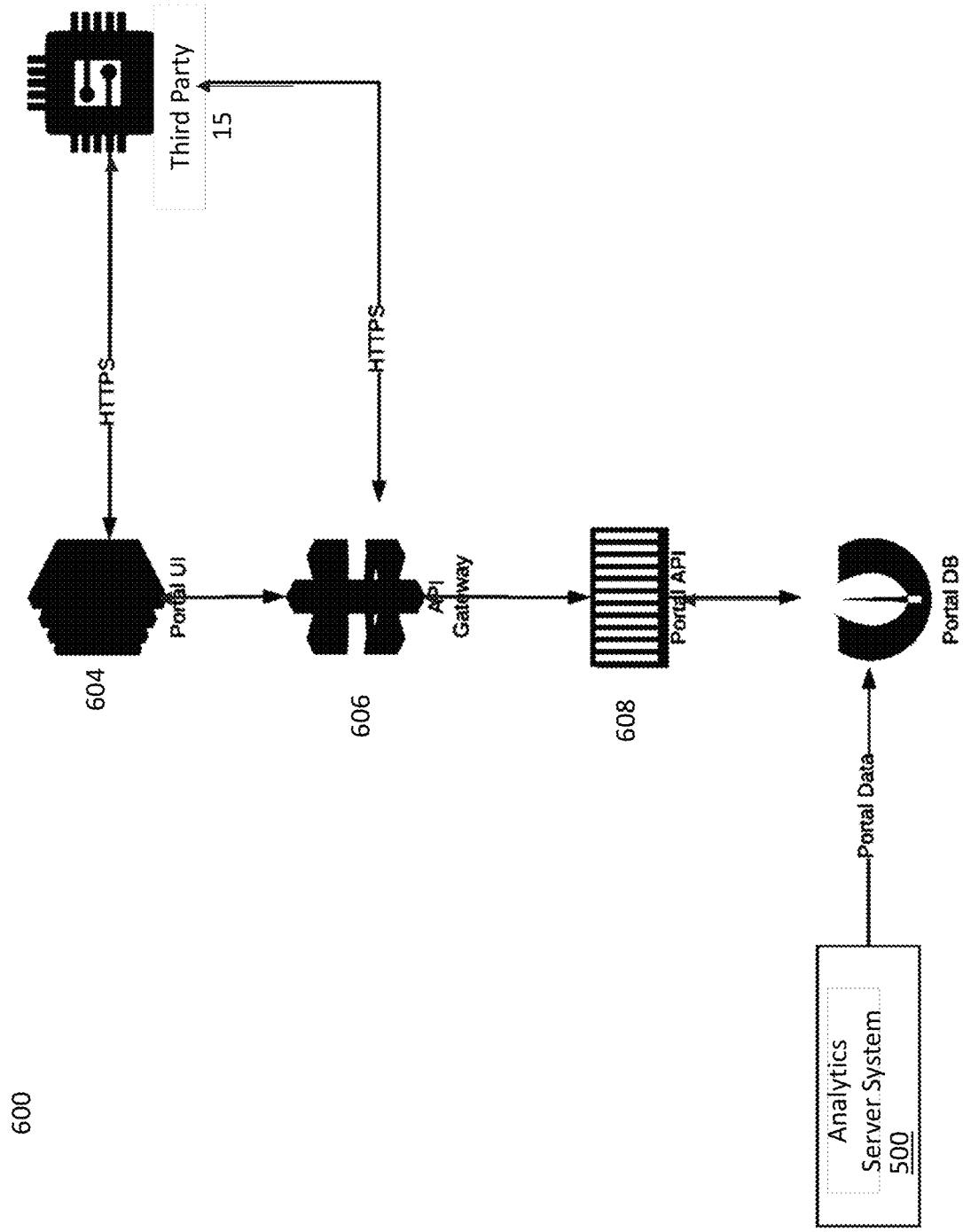
FIG. 6 illustrates a logical architecture and flowchart for a process for a Portal Server system in accordance with at least one of the various embodiments.

FIG. 6 is a logical architecture for a Portal Server system 600. In at least one embodiment, Portal Server system 600 can be one or more computers arranged to ingest and throughput records and event data. The Portal Server system 600 can be configured with a Portal User Interface 604 and API Gateway 606 for a Portal API 608 to interface and accept data from third party 15 users of the platform. In an embodiment, the Portal Server system 600 can be configured to provide daily static aggregates and is configured with search engine and access portals for real time access of data provided by the Analytics Server system 500. In at least one embodiment, Portal Server system 600 can be configured to provide a Dashboard to users, for example, to third party 15 client computers. In at least one embodiment, information from Analytics Server system 500 can flow to a report generator provided by a Portal User interface 604. In at least one embodiment, a report generator can be arranged to generate one or more reports based on the performance information. In at least one embodiment, reports can be determined and formatted based on one or more report templates.

FIG. 7 is a flow chart showing a data pipeline of data processing as described above. As shown in FIG. 7, in an embodiment, event data passes data through a seven (7) stage pipeline of data quality checks. In addition, data processes are carried out employing both stream processing and batch processing. Streaming operates on a record at a time and does not hold context of any previous records for a trip, and can be employed for checks carried out at the Attribute and record level. Batch processing can take a more complete view of the data and can encompass the full end-to-end process. Batch processing undertakes the same checks as streaming plus checks that are carried out across multiple records and Journeys.

In at least one embodiment, a dashboard display can render a display of the information produced by the other components of the system 10. In at least one embodiment, dashboard display can be presented on a client computer accessed over network. In at least one embodiment, user interfaces can be employed without departing from the spirit and/or scope of the claimed subject matter. Such user interfaces can have any number of user interface elements, which can be arranged in various ways. In some embodiments, user interfaces can be generated using web pages, mobile applications, GIS visualization tools, mapping interfaces, emails, file servers, PDF documents, text messages, or the like. In at least one embodiment, Ingress Server system 100, Stream Processing Server system 200, Egress Server system 400, Analytics Server system 500, or Portal Server system 600 can include processes and/or API's for generating user interfaces.

As described herein, embodiments of the system 10, processes and algorithms can be configured to run on a web services platform host such as Amazon Web Services (AWS)® or Microsoft Azure®. A cloud computing architecture is configured for convenient, on-demand network access to a shared pool of configurable computing resources (e.g. networks, network bandwidth, servers, processing, memory, storage, applications, virtual machines, and services). A cloud computer platform can be configured to allow a platform provider to unilaterally provision computing capabilities, such as server time and network storage, as needed automatically without requiring human interaction with the service's provider. Further, cloud computing is available over a network and accessed through standard mechanisms that promote use by heterogeneous thin or thick client platforms (e.g., mobile phones, laptops, and PDAs). In a cloud computing architecture, a platform's computing resources can be pooled to serve multiple consumers, partners or other third party users using a multi-tenant model, with different physical and virtual resources dynamically assigned and reassigned according to demand. A cloud computing architecture is also configured such that platform resources can be rapidly and elastically provisioned, in some cases automatically, to quickly scale out and rapidly released to quickly scale in.

Cloud computing systems can be configured with systems automatically control and optimize resource use by leveraging a metering capability at some level of abstraction appropriate to the type of service (e.g., storage, processing, bandwidth, and active user accounts). Resource usage can be monitored, controlled, and reported. As described herein, in embodiments, the system 10 is advantageously configured by the platform provider with innovative algorithms and database structures configured for low-latency.

A cloud computing architecture includes a number of service and platform configurations.

A Software as a Service (SaaS) is configured to allow a platform provider to use the provider's applications running on a cloud infrastructure. The applications are accessible from various client devices through a thin client interface such as a web browser (e.g., web-based e-mail). The consumer typically does not manage or control the underlying cloud infrastructure including network, servers, operating systems, storage, or even individual application capabilities, with the possible exception of limited user-specific application configuration settings.

A Platform as a Service (PaaS) is configured to allow a platform provider to deploy onto the cloud infrastructure consumer-created or acquired applications created using programming languages and tools supported by the provider. The consumer does not manage or control the underlying cloud infrastructure including networks, servers, operating systems, or storage, but can a have control over the deployed applications and possibly application hosting environment configurations.

An Infrastructure as a Service (IaaS) is configured to allow a platform provider to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

A cloud computing architecture can be provided as a private cloud computing architecture, a community cloud computing architecture, or a public cloud computing architecture. A cloud computing architecture can also be configured as a hybrid cloud computing architecture comprising two or more clouds platforms (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
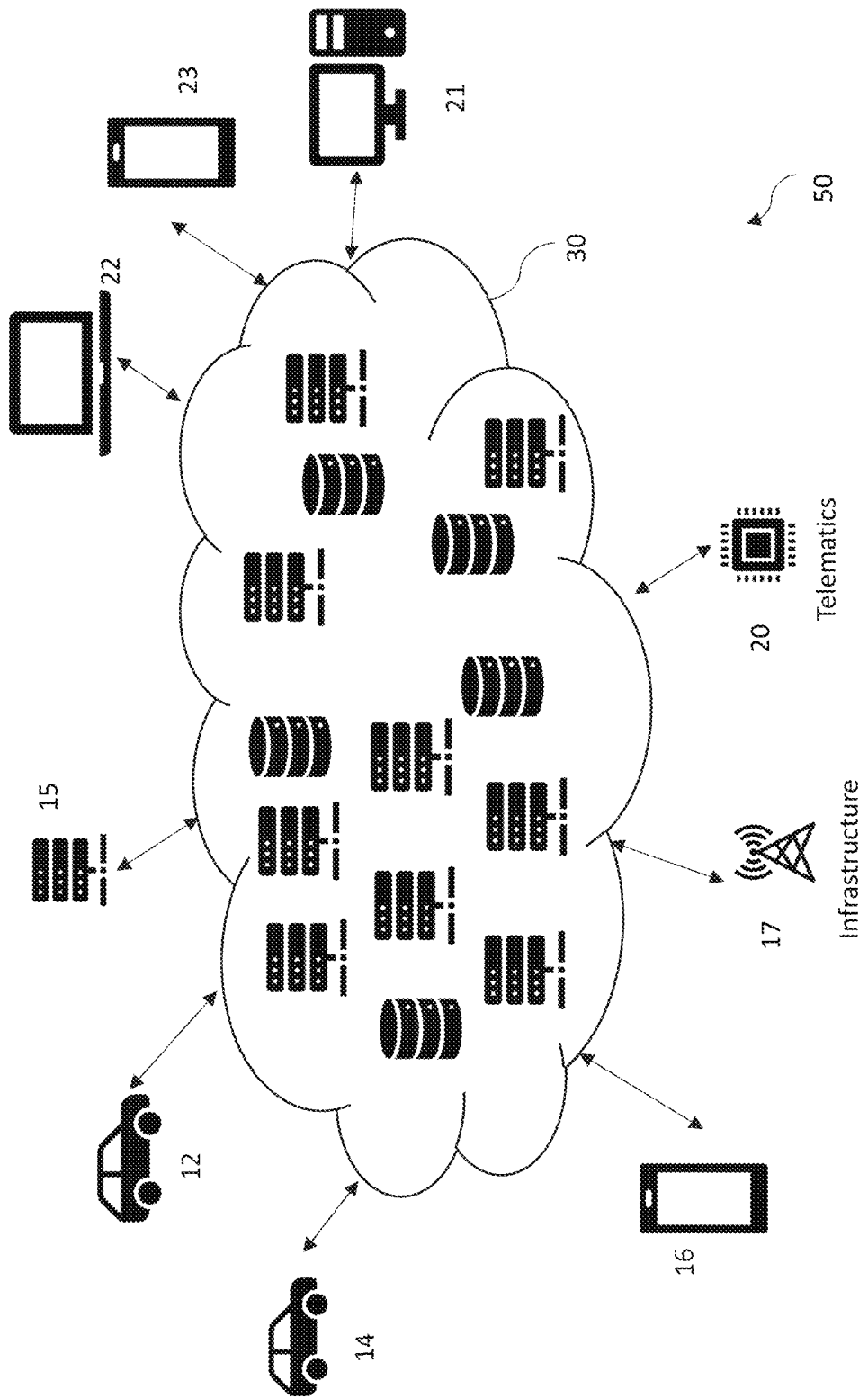
FIG. 8 illustrates a cloud computing architecture in accordance with at least one of the various embodiments.

Referring now to FIG. 8, an illustrative cloud computing environment 50 is depicted. As shown, cloud computing environment 50 comprises one or more cloud computing nodes 30 with which local computing devices used by cloud consumers, such as, for example, personal digital assistant (PDA) or cellular telephone 23, desktop computer 21, laptop computer 22, and event such as OEM vehicle sensor data source 14, application data source 16, telematics data source 20, wireless infrastructure data source 17, and third party data source 15 and/or automobile computer systems such as vehicle data source 12. Nodes 30 can communicate with one another. They can be grouped (not shown) physically or virtually, in one or more networks, such as private, community, public, or hybrid clouds as described herein, or a combination thereof. The cloud computing environment 50 is configured to offer infrastructure, platforms and/or software as services for which a cloud consumer does not need to maintain resources on a local computing device. It is understood that the types of computing devices shown in FIG. 9 are intended to be illustrative only and that computing nodes 30 and cloud computing environment 50 can communicate with any type of computerized device over any type of network and/or network addressable connection (e.g., using a web browser).

Figure 9:
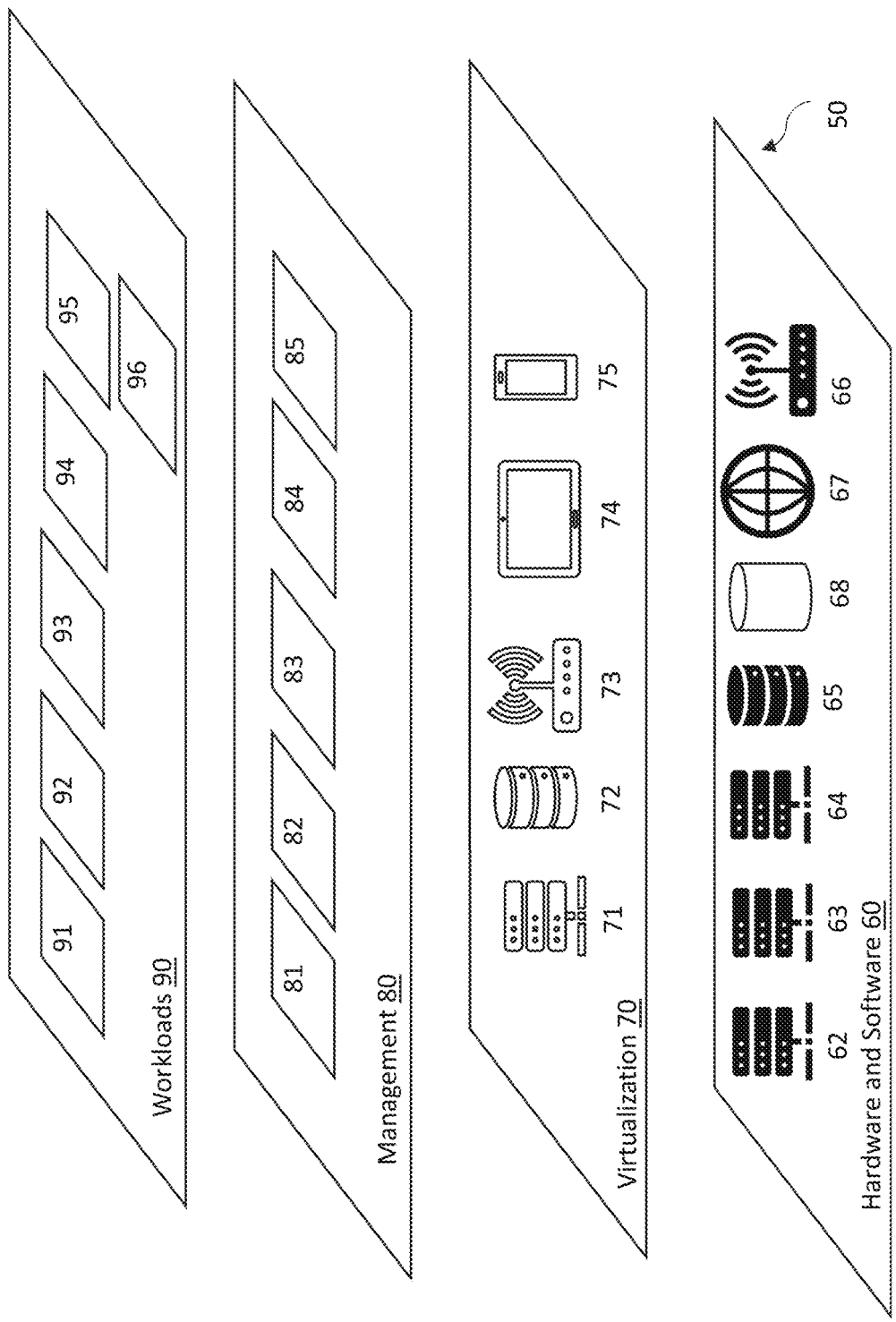
FIG. 9 illustrates a logical architecture for cloud computing platform in accordance with at least one of the various embodiments.

Referring now to FIG. 9, a set of functional abstraction layers provided by cloud computing environment 50 (FIG. 8) is shown. The components, layers, and functions shown in FIG. 9 are illustrative, and embodiments as described herein are not limited thereto. As depicted, the following layers and corresponding functions are provided:

A hardware and software layer 60 can comprise hardware and software components. Examples of hardware components include, for example: mainframes 61; servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management so that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment can be utilized. Examples of workloads and functions that can be provided from this layer include mapping and navigation 91; ingress processing 92, stream processing 93; portal dashboard delivery 94—same number; data analytics processing 95; and egress and data delivery 96.

Although this disclosure describes embodiments on a cloud computing platform, implementation of embodiments as described herein are not limited to a cloud computing environment.

Embodiments described with respect to systems 10, 50, 100, 200, 400, 500, 600 and 700 described in conjunction with FIGS. 1-9, can be implemented by and/or executed on a single network computer. In other embodiments, these processes or portions of these processes can be implemented by and/or executed on a plurality of network computers. Likewise, in at least one embodiment, processes described with respect to systems 10, 50, 100, 200, 400, 500 and 600, or portions thereof, can be operative on one or more various combinations of network computers, client computers, virtual machines, or the like can be utilized. Further, in at least one embodiment, the processes described in conjunction with FIGS. 1-9 can be operative in system with logical architectures such as those also described in conjunction with FIGS. 1-9.

It will be understood that each block of the flowchart illustration, and combinations of blocks in the flowchart illustration, can be implemented by computer program instructions. These program instructions can be provided to a processor to produce a machine, such that the instructions, which execute on the processor, create means for implementing the actions specified in the flowchart block or blocks. The computer program instructions can be executed by a processor to cause a series of operational steps to be performed by the processor to produce a computer-implemented process such that the instructions, which execute on the processor to provide steps for implementing the actions specified in the flowchart block or blocks. The computer program instructions can also cause at least some of the operational steps shown in the blocks of the flowchart to be performed in parallel. Moreover, some of the steps can also be performed across more than one processor, such as might arise in a multi-processor computer system or even a group of multiple computer systems. In addition, one or more blocks or combinations of blocks in the flowchart illustration can also be performed concurrently with other blocks or combinations of blocks, or even in a different sequence than illustrated without departing from the scope or spirit of the disclosure.

Accordingly, blocks of the flowchart illustration support combinations for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments.

The invention claimed is:

1. A system comprising a memory including program instructions and a processor configured to execute the instructions for the method, the method comprising:
   ingesting location event data, wherein the location event data is anonymized;
   geohashing locations of the location event data to obtain geohashed locations that each has a precision that uniquely correlates the location event data to a vehicle; and
   identifying a journey for the vehicle from the location event data, wherein the journey identification comprises tracking movement as indicated by the geohashed locations over a period of time to determine a journey segment for the journey for the vehicle.

2. The system of claim 1, wherein the location event data comprises time, position specifying a latitude and a longitude, and event of interest.

3. The system of claim 1, wherein geohashing locations of the location event data includes obtaining a geohashed location for each location of the location event data by geohashing a latitude and longitude of the location to a rectangle whose edges are proportional to a number of characters in a string that is to represent the geohashed location.

4. The system of claim 1, wherein the processor is configured to execute the instructions for the method further comprising mapping the geohash to a map database.

5. The system of claim 4, the mapping further comprises mapping at least one of the geohashed locations to a point of interest database.

6. The system of claim 1, wherein the journey identification comprises: identifying an engine on or start movement for the vehicle; identifying an engine off or stop movement for the vehicle; identifying a dwell time for the vehicle; identifying a minimum distance of travel for the vehicle; and identifying a minimum duration of travel.

7. The system of claim 6, wherein the processor is configured with a minimum duration of travel criterion and to execute the instructions for identifying the minimum duration of travel for the vehicle using the minimum duration of travel criterion.

8. The system of claim 7, wherein the minimum duration of travel criterion is from 60 to 120 seconds.

9. The system of claim 8, wherein the minimum duration of travel criterion is 60 seconds.

10. The system of claim 6, wherein the processor is configured with a maximum dwell time criterion and to execute the instructions for identifying the maximum dwell time for the vehicle using the maximum dwell time criterion.

11. The system of claim 10, wherein the maximum dwell time criterion is from 20 to 60 seconds.

12. The system of claim 11, wherein the maximum dwell time criterion is 30 seconds.

13. The system of claim 6, wherein the processor is configured with a minimum distance of travel criterion and to execute the instructions for identifying the minimum distance of travel for the vehicle using the minimum distance of travel criterion.

14. The system of claim 13, wherein the minimum distance of travel criterion is from 100 meters to 300 meters.

15. The system of claim 14, wherein the minimum distance of travel criterion is 200 meters.

16. The system of claim 1, wherein the journey identification comprises determining that a second journey segment does not form part of the journey.

17. The system of claim 1, wherein the system is configured to provide active vehicle detection.

18. The system of claim 17, wherein the active vehicle detection comprises identifying a vehicle path from a plurality of events and the geohashed locations over the period of time.

19. The system of claim 17, wherein the active vehicle detection comprises: identifying the vehicle path from the plurality of events over the period of time includes using a connected components algorithm, and wherein use of the connected components algorithm includes identifying the vehicle path in a directed graph, wherein in the graph, a node is the vehicle and a connection between nodes is the identified vehicle path.

20. The system of claim 1, wherein the system comprises a data warehouse and stores the location event data and journey determination data in the data warehouse.

21. The system of claim 20, further comprising at least one-time column that is added to the stored data.

22. The system of claim 21, wherein the time column includes a date column and an hour column.

23. The system of claim 1, wherein the method further includes anonymizing the location event data to remove a vehicle identification number (VIN) or at least characters of the VIN that uniquely identify the vehicle.

24. The system of claim 23, wherein identifying the journey for the vehicle from the location event data includes generating a device identification (ID) that is then passed through a subgraph of a connected components algorithm, and wherein the connected components algorithm is used to track the movement as indicated by the geohashed locations over the period of time to determine the journey segment for the journey for the vehicle.

25. A system comprising a memory including program instructions and a processor configured to execute the instructions for the method, the method comprising:

ingesting a plurality of anonymized location event data entries, wherein each of the plurality of anonymized location event data entries specifies a location and an event without information identifying any single vehicle;

geohashing the location of each of the plurality of location event data entries to obtain a geohashed location having a precision that uniquely correlates the event of the location event data entry to a first vehicle;

identifying a first journey segment for the first vehicle from the plurality of location event data entries;

identifying a second journey segment for the first vehicle from the plurality of location event data entries, wherein the identification of the first and second journey segments comprises tracking movement as indicated by the geohashed locations over a period of time; and determining a journey for the first vehicle, wherein the journey incudes the first journey segment and the second journey segment.

26. A system comprising a memory including program instructions and a processor configured to execute the instructions for the method, the method comprising:

ingesting a plurality of anonymized location event data entries, wherein each of the plurality of anonymized location event data entries specifies a location and an event without information identifying any single vehicle;

geohashing the location of each of the plurality of location event data entries to obtain a geohashed location having a precision that uniquely correlates the event of the location event data entry to a first vehicle; and identifying a vehicle path from the plurality of events tracking movement as indicated by the geohashed locations over a period of time, the identification comprising using a connected components algorithm in which a node represents the geohashed location.

* * * * *